United States Patent

Rau et al.

[11] 4,165,915
[45] Aug. 28, 1979

[54] LIGHT CONDUCTING FIBER

[75] Inventors: Karlheinz Rau, Hanau; Albert Mühlich, Frankfurt; Fritz Simmat, Gelnhausen; Norbert Treber, Kriftel, all of Fed. Rep. of Germany

[73] Assignee: Heraeus Quarzschmelze GmbH, Hanau, Fed. Rep. of Germany

[21] Appl. No.: 713,479

[22] Filed: Aug. 11, 1976

[30] Foreign Application Priority Data

Aug. 16, 1975 [DE] Fed. Rep. of Germany ....... 2536456

[51] Int. Cl.$^2$ .......................... G02B 5/14; C03C 25/02
[52] U.S. Cl. .................................. 350/96.34; 65/3 A; 350/96.30; 428/375
[58] Field of Search ........... 350/96 WG, 96.29, 96.30, 350/96.34; 428/375; 65/3 A, 36

[56] References Cited

U.S. PATENT DOCUMENTS

| 3,784,386 | 1/1974 | Araujo et al. | 350/96 WG |
| 3,856,494 | 12/1974 | Kitano et al. | 350/96 WG |
| 3,869,194 | 3/1975 | Shiraishi et al. | 350/96.30 |
| 3,884,550 | 5/1975 | Maurer et al. | 350/96 WG |
| 3,933,454 | 1/1976 | DeLuca | 350/96 WG |
| 4,082,420 | 4/1978 | Shiraishi et al. | 350/96.31 |

Primary Examiner—John K. Corbin
Assistant Examiner—Stewart Levy
Attorney, Agent, or Firm—Sprung, Felfe, Horn, Lynch & Kramer

[57] ABSTRACT

A semiproduct for use in the manufacture of light conducting fibers comprising a core of synthetic quartz glass having a thickness of 6 to 400 mm, the quartz glass containing less than 10 ppm hydroxyl ions and having, in the near infrared spectral range, an optical loss totaling less than 4 dB/km, measured in the mass, the core being fused with a jacket having a wall thickness of 2 to 20 mm and consisting essentially of synthetic quartz glass containing more than 4,000 ppm of fluorine, the jacket having a length of at least 200 mm; a method of producing the same and light conducting fibers derived therefrom.

13 Claims, 3 Drawing Figures

LIGHT CONDUCTING FIBER

BACKGROUND OF THE INVENTION

1. Field of the Invention

The invention relates to a semiproduct for the manufacture of light conducting fibers, especially those for the multimode conduction of light signals, to a method of making the semiproduct, and to a light conducting fiber made from the semiproduct.

2. Discussion of the Prior Art

In the manufacture of light conducting fibers from glassy material, it is known to use as semiproducts tubes of small wall thickness and thin rods (German "Offenlegungsschrift" No. 2,418,168). From these two semiproducts, a light conducting fiber is made by inserting a thin rod into a tube whose inside diameter is slightly larger than the diameter of the rod. Both are heated at one end by means of a heat source to such a degree that a light conducting fiber of a diameter of approximately 50 μm can be drawn from the heated zone. The tubular material forms the jacket of the light conducting fiber, whose core consists of the rod material. These light conducting fibers, manufactured by the "rod-and-tube process", thus require two semiproducts.

In the use of these semiproducts for the manufacture of light conducting fibers, considerable difficulty consists in cleansing the inside surface of the tubes (the inside diameter is of the order of a few millimeters) such that no residual impurities will remain which result in the formation of small bubbles at the interface between the jacket and core when the fibers are drawn, which cause increased scatter losses.

From U.S. Pat. No. 3,711,262 it is known to manufacture light conducting fibers having a core and jacket by coating the mechanically and flame polished inside wall of a glass tube with a thin film of a vitreous material which forms the core of the light conducting fiber. The internally coated glass tube is then heated to the drawing temperature and drawn to form the light conducting fiber. Quartz glass, for example, is used as the material of the tube, the internal coating in that case consisting of a silica glass which is doped with an oxide which increases the index of refraction.

The use of synthetic quartz glass containing less than 5 ppm of hydroxyl ions, less than 5 ppm of metal ions and less than 12 scattering centers visible to the naked eye per cubic centimeter, as a material for the core or jacket of a light conducting fiber is known from German "Auslegeschrift" No. 2,202,787.

Lastly, from U.S. Pat. No. 3,869,194 it is known that light conducting fibers with a core of high-purity quartz glass and a jacket of fluoride glass or fluoride-containing quartz glass have proven unsuitable for optical signal transmission.

SUMMARY OF THE INVENTION

Broadly, this invention contemplates a semiproduct for use in the manufacture of light conducting fibers which semiproduct comprises a core of synthetic quartz glass having a thickness of 6 to 400 mm, especially synthetic quartz glass obtained from gaseous silicon halide, said quartz glass containing less than 10 ppm hydroxyl ions and having, in the near infrared spectral range, an optical loss totaling less than 4 dB/km, measured in the mass, said core fused with a jacket having a wall thickness of 2 to 20 mm and consisting essentially of synthetic quartz glass, especially synthetic quartz glass derived from gaseous silicon halide, containing more than 4,000 ppm of fluorine, said jacket having a length of at least 200 mm.

This invention further contemplates a process for producing such a semiproduct which comprises disposing within a hollow of a synthetic quartz glass hollow cylinder having less than 10 ppm hydroxyl ions and more than 4,000 ppm fluorine ions, whose inside and outside surfaces have been ground, a core of an exteriorly ground solid cylinder of synthetic quartz glass containing less than 10 ppm of hydroxyl ions and having an optical loss total, in the near infrared spectral range, of less than 4 dB/km, measured in the mass, fusing said cylinder to said core and drawing the fusion product into a semiproduct having a diameter of more than 8 mm but less than 60 mm.

This invention further relates to light conducting fibers prepared from drawing such as under heat such a semiproduct into fibers of the desired length and thickness.

It is therefore an object of this invention to provide a semiproduct for the manufacture of light conducting fibers in such a form that the product can be readily stocked and it is assured that the semiproduct will provide a light conducting fiber of the desired optical characteristics. More especially, it is an object of the invention to provide a semiproduct which can be stored whereby the skilled artisan can know concretely in advance what optical characteristics and qualities of light conducting fibers can be made from such semiproduct.

It has been found that the objects of this invention are achieved with a semiproduct of the kind described above if it has a 6 to 40 mm thick core of synthetic quartz glass obtained from gaseous silicon halides and containing less than 10 ppm of hydroxyl ions and having, in the near infrared spectral range, especially at 850 nanometers, an optical loss totaling less than 4 dB/km, measured in the mass, the said core being fused with a jacket of 2 to 20 mm wall thickness consisting of synthetic quartz glass obtained from gaseous silicon halides and containing more than 4000 ppm of fluorine ions, and if it has a length of at least 200 mm.

Semiproducts of this kind in which the fluorine ion content ranges between 8000 and 40,000 ppm have proven to be practical. The synthetic quartz glass of the core of the semiproduct can advantageously contain an additional content of 5000 to 20,000 ppm of substances which increase the index of refraction. Titanium dioxide, aluminum trioxide, phosphorus pentoxide or germanium oxide have proven suitable for this purpose. More advantageously, a core is used whose refractive index decreases with the distance from the core axis.

A semiproduct in accordance with the invention is prepared in a preferred manner as follows: a cylinder provided with a bore and made from synthetic quartz glass containing less than 10 ppm of hydroxyl ions and more than 4000 ppm of fluorine ions, whose outside surface is finely ground and whose finely ground inside surface, after cleansing in a cleaning agent containing at least 30% hydrofluoric acid, is fused in a tubular furnace to a solid cylinder of synthetic quartz glass containing less than 10 ppm of hydroxyl ions and having an optical loss total, in the near infrared spectral range, of less than 4 dB/km, measured in the mass, whose surface has been finely ground and cleansed with a cleaning agent containing at least 30% hydrofluoric acid, and the fusion product thus obtained is then immediately drawn to a diameter of more than 8 mm but less than 60 mm. It has been found desirable to polish the inside surface of the bored cylinder before introducing the solid cylinder. It has proven advantageous, before the insertion of the solid cylinder, to subject the bored cylinder to an ultrasonic cleaning process. It is also advantageous to polish the surface of the solid cylinder prior to insertion into the bored cylinder. Flame polishing has proven an especially good method for this polishing operation and that of the inside surface of the bored cylinder.

The polished surface of the solid cylinder is also advantageously subjected to an ultrasonic cleaning before the solid cylinder is inserted into the bored cylinder.

BRIEF DESCRIPTION OF DRAWINGS

Referring to the drawings herein.

DESCRIPTION OF SPECIFIC EMBODIMENT

Figure 1:
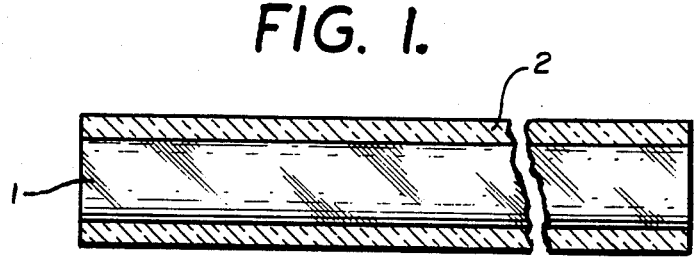
FIG. 1 is a sectional side elevational view of a semiproduct of the invention.

Referring to the drawings herein, a longitudinal cross section of a semiproduct in accordance with the invention is represented in FIG. 1. It consists of the core 1 of synthetic quartz glass having the characteristics specified above. This core is fused with its jacket 2 of synthetic quartz glass containing more than 4000 ppm of fluorine ions.

In the semiproduct of the invention, the material of which the core consists and the jacket material are not appreciably different with regard to viscosity and elongation at temperatures up to about 2300° C., and this enables a tension-free semiproduct to be prepared. Semiproducts of the invention can be accurately tested optically before they are drawn to light conducting fibers. The quality of the light conducting fibers that can be drawn from this semiproduct is predictable because no ill effects, such as the formation of bubbles in the case of the "rod-and-tube process" mentioned above, can occur in connection with the core and jacket interface. Previously tested and very homogeneous materials can be used in producing the semiproduct of the invention, so that semiproducts of unvarying and reproducible quality, which will carry through to the drawn light conducting fibers, can be manufactured.

Figure 2:
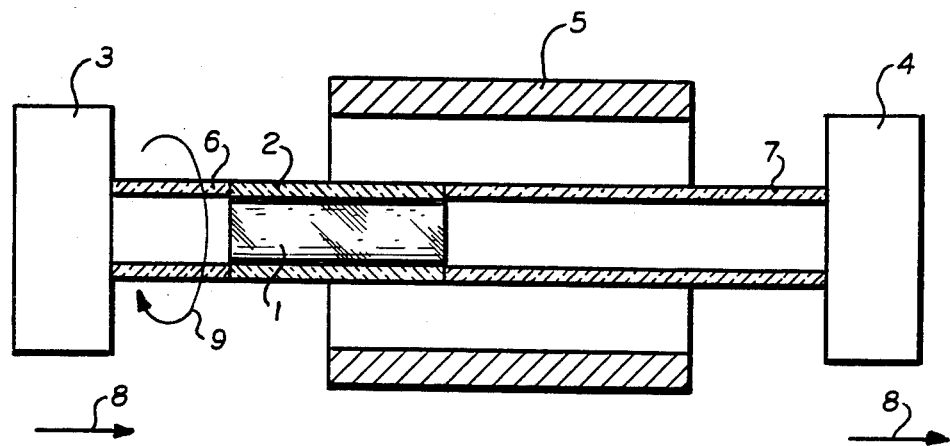
FIG. 2 is a sectional side elevational view showing the manner in which the bore is inserted within the hollow of a cylinder and the so jacketed assembly is rotated and fused.

The preparation of a semiproduct in accordance with the invention will now be explained with the aid of FIG. 2.

The starting materials are a cylinder of synthetic quartz glass containing less than 10 ppm of hydroxyl ions and doped with fluorine, having an outside diameter of 95 mm, a length of 520 mm, and a refractive index of 1.4532, and a cylinder of synthetic quartz glass containing less than 10 ppm of hydroxyl ions, and having an outside diameter of 59 mm, a length of 500 mm, and a refractive index of 1.4585. In the fluorine-doped cylinder 2, a central internal bore of 59.5 mm diameter is then produced, its outside and inside surfaces as well as the surface of the undoped cylinder 1 are finely ground, and both parts are cleansed for about 5 minutes in a 50% hydrofluoric acid bath. After the inside surface of the doped cylinder has been flame-polished, it is subjected to an ultrasonic cleaning, and at each of its extremities a hollow cylinder 6 and 7 of common quartz glass is welded so as to serve as aids in the drawing process in the tubular furnace. This assembly is again cleansed in 50% hydrofluoric acid, and then subjected to an ultrasonic cleaning. After the surface of the undoped cylinder has been flame polished, it is inserted into the bore in the doped cylinder in a dust-free atmosphere. This assembly of the parts 6, 2, 1 and 7 is clamped at one end in a feed unit 3 and at the other end in a draw unit 4 in the horizontal position. The feed direction and draw direction are indicated by arrow 8. Each of the units 3 and 4 also comprise a rotating device, so that the assembly rotates in the direction indicated by the arrow 9 at a speed of 10 to 100 rpm, for example, 45 revolutions per minute, as it passes through the tubular furnace 5 which is maintained at a temperature of, say, 2000° to 2500° C., e.g.

The feed unit 3 is set for a feed speed of 8 mm per minute, while the draw unit speed is increased slowly and steadily from 0 to 200 mm/min. The inside surface of the bored cylinder of fluorine-doped synthetic quartz glass fuses bubble-free with the surface of the cylinder 1 of undoped synthetic quartz glass.

After the removal of the two auxiliary parts of common quartz glass, a semiproduct in accordance with the invention is obtained which has a length of about 12 m and a diameter of 18 mm. From this, pieces of, say, 600 mm in length are severed, from which at some later time light conducting fibers of the kind claimed can be drawn in a drawing machine which is known in itself. Thus, for example, a 600 mm long semiproduct of 18 mm diameter can be drawn to a light conducting fiber of, say, 7.5 km in length, with an outside diameter of 160 $\mu$m and a core diameter of 100 $\mu$m.

The light conducting fiber in accordance with the invention is thus made by drawing a semiproduct which consists of a fused-together core and envelope; it has a jacket of quartz glass containing less than 10 ppm of hydroxyl ions and more than 4000 ppm, especially 8000 to 40,000 ppm of fluorine ions, and a core of quartz glass containing less than 10 ppm of hydroxyl ions, the quartz glass of the core and jacket being a quartz glass obtained from silicon halides. Light conducting fibers of this kind can additionally contain in the quartz glass of the core 5000 to 20,000 ppm of titanium dioxide, aluminum trioxide, phosphorus pentoxide or germanium dioxide. Light conductors of the invention have optical losses totaling 6 dB/km or less at a light wavelength of 850 nm.

Figure 3:
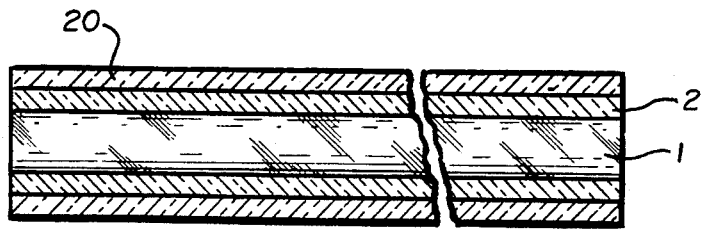
FIG. 3 is a sectional side elevation of another semiproduct of the invention having an outer jacket 20 of higher refractive index.

FIG. 3 shows a semiproduct of the invention in longitudinal cross section, the semiproduct differing from the one represented in FIG. 1 in that a tube of glassy material, such as quartz glass or doped quartz glass having a higher refractive index than that of the envelope is fused in a known manner onto the fluorine-ion-doped envelope 2, to serve as an outer jacket 20.

The synthetic quartz glass, containing less than 10 ppm hydroxyl ions and having, in the near infrared spectral range an optical loss totaling less than 4 dB/km, measured in the mass, is produced as follows: From a reservoir hydrogen-free silicon tetrachloride is pumped into a heated vaporizing dish in a vessel. Oxygen is also fed into this vessel. The mixture of oxygen and silicon tetrachloride formed in the vessel is delivered into an induction-coupled plasma burner, supplied by a high-frequency electric power generator. Into the housing which contains the plasma burner there extends a quartz glass piece, the free end of which serves as the substrate on which the synthetic quartz glass is deposited. As soon as the plasma burner is burning properly the free end of the quartz glass piece is advanced into the frame of the burner and heated with simultaneous rotation. When a temperature of about 1900° C. is reached, the mixture of vaporous silicon tetrachloride and oxygen is fed into the burner at a rate, for example, of 1 kg/h. Due to the high temperature of the plasma flame silicon tetrachloride decomposes and reacts with the oxygen to form $SiO_2$, which deposits itself on the free end of the quartz glass piece and vitrifies. Since only gases or vapors which are free of hydrogen are used, the produced synthetic quartz glass is free of hydroxyl ions. The quartz glass piece is retracted according to the amount as synthetic quartz glass is deposited on its free end. The rod of synthetic quartz glass produced in this manner is used as starting material in the form of a cylinder.

The starting material in the form of a cylinder of synthetic quartz glass containing less than 10 ppm of hydroxyl ions and doped with fluorine is produced according to the undoped cylinder of synthetic quartz glass as described above. The main difference is that not only a vaporous mixture of silicon tetrachloride and oxygen is fed into the plasma burner but also oxygen to which dichlorodifluoromethane ($CCl_2F_2$) is admixed, at a rate, for example, of 0.7 kg/h. The silicon tetrachloride and the dichlorodifluoromethane are decomposed by the high temperature of the plasma flame and fluorine is incorporated into the vitreous $SiO_2$ in a proportion of, for example, 5000 parts per million. Since only gases and vapors which are free of hydrogen are used, the product, fluorine-doped synthetic quartz glass, is free of hydroxyl ions.

What is claimed is:

1. A semiproduct for use in the manufacture of light conducting fibers comprising a core selected from the group consisting of synthetic quartz glass containing a minor amount of a refractive index increasing material and a material consisting essentially of synthetic quartz glass having a thickness of 6 to 400 mm obtained from gaseous silicon halide, said quartz glass containing less than 10 ppm hydroxyl ions and having, in the near infrared spectral range an optical loss totaling less than 4 dB/km, measured in the mass, said core fused with a jacket having a wall thickness of 2 to 20 mm and selected from the group consisting of a material comprising synthetic quartz glass and a material consisting essentially of synthetic quartz glass, obtained from gaseous silicon halide containing more than 4000 ppm of fluorine, said jacket having a length of at least 200 mm.

2. A semiproduct according to claim 1 whose core has under infrared analysis at 850 nanometers an optical loss totaling less than 4 dB/km.

3. A semiproduct according to claim 1 wherein the fluorine content of said jacket is between 8000 and 40,000 ppm.

4. A semiproduct according to claim 1 wherein the refractive index of said core diminishes with the distance from the core axis.

5. A semiproduct according to claim 1 wherein said fluorine is in the form of fluorine ions.

6. A semiproduct according to claim 1 wherein said core additionally contains 5000 to 20,000 ppm of a refractive index increasing material.

7. A semiproduct according to claim 6 wherein said refractive index increasing material is selected from the group consisting of titanium dioxide, aluminum trioxide, phosphorus pentoxide and germanium oxide.

8. A semiproduct according to claim 1 wherein said jacket is sheathed in a jacket of glassy material.

9. A semiproduct according to claim 8 wherein said glassy material is quartz glass.

10. A light conducting fiber, especially for the multimode conduction of light signals comprising a core and a jacket, said core selected from the group consisting of synthetic quartz glass containing a minor amount of a refractive index increasing material and a material consisting essentially of synthetic quartz glass obtained from gaseous silicon halide, said quartz glass containing less than 10 ppm hydroxyl ions and having, in the near infrared spectral range an optical loss totaling less than 4 dB/km, measured in the mass, said jacket selected from the group consisting of a material comprising synthetic quartz glass and a material consisting essentially of synthetic quartz glass, obtained from gaseous silicon halide, containing between 8000 and 40,000 ppm of fluorine.

11. A light conducting fiber according to claim 10, wherein said jacket contains between 8000 and 40,000 ppm fluorine.

12. A light conducting fiber according to claim 10 having a core additionally containing 5000 to 20,000 ppm of $TiO_2$, $Al_2O_3$, $P_2O_5$, or $GeO_3$.

13. A light conducting fiber according to claim 10 wherein said fluorine is in the form of ions.

* * * * *